United States Patent Office 2,790,539
Patented Apr. 30, 1957

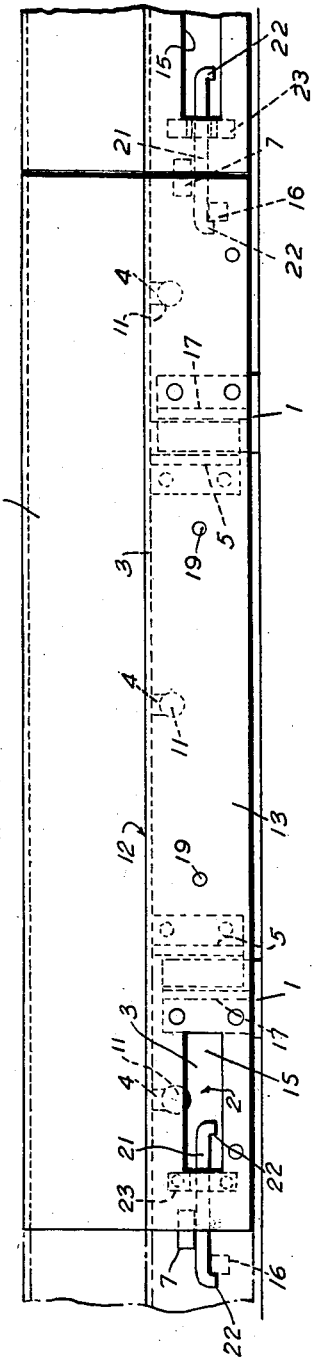

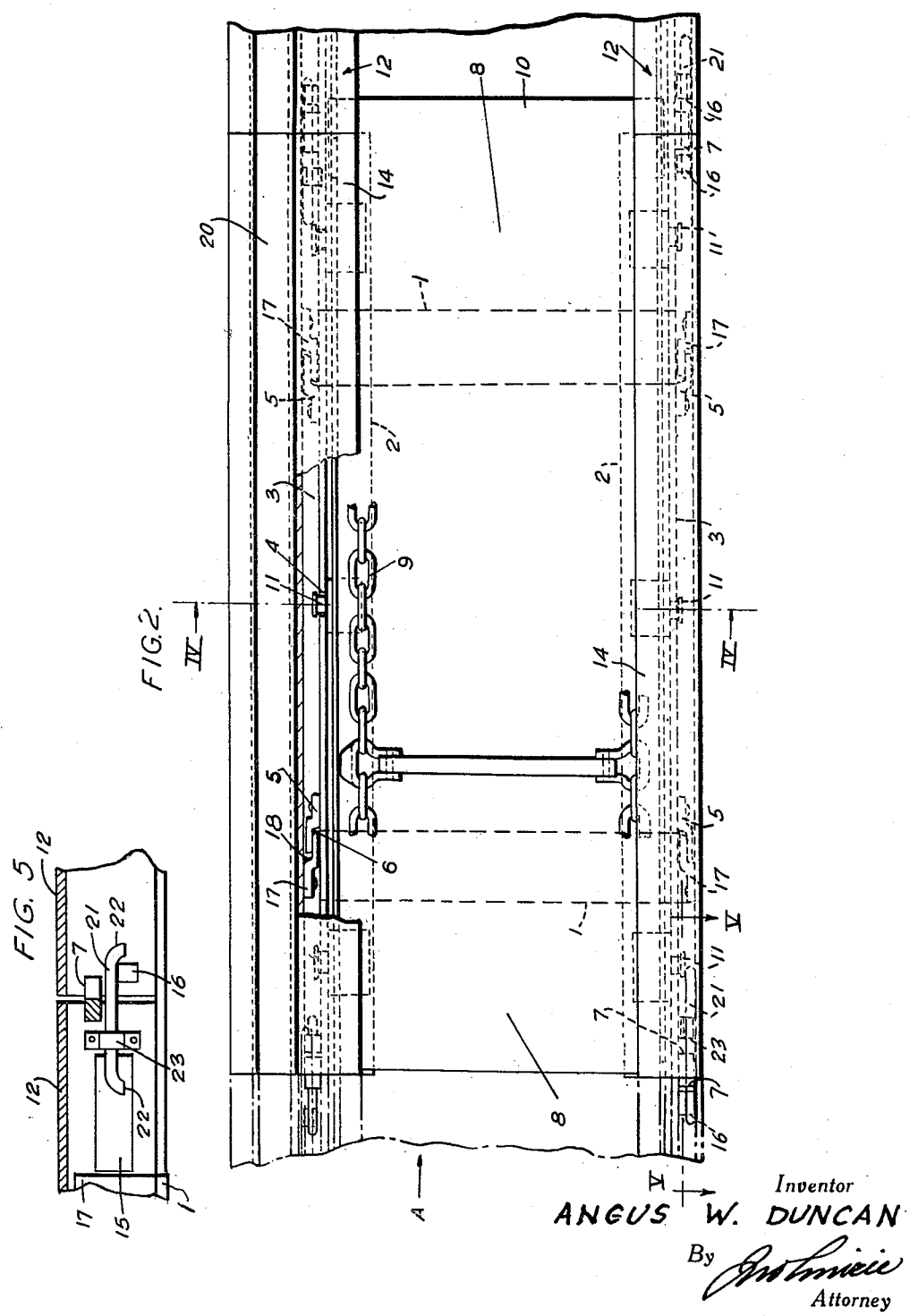

2,790,539

CONVEYORS

Angus Wellesley Duncan, Worcester, England, assignor to The Mining Engineering Company Limited, Worcester, England Application March 25, 1952, Serial No. 278,413

Claims priority, application Great Britain April 4, 1951

13 Claims. (Cl. 198—204)

In underground mining practice it is well known to employ scraper chain conveyors having a very robust structure on to which the coal or other mined material may be shot down and on which the cutting machine may be mounted. Such conveyors generally employ two side chains of the cable type with scraper bars attached at intervals. It is usual to have the connection between structure sections so arranged that a limited measure of flexibility is given to enable the conveyor to be moved forward or "snaked" while running.

Such conveyor sections may be of one piece construction welded or riveted but in the thinner seams it is common practice to employ structure of somewhat lighter constructions built up from components which can be transported more easily in the confined conditions and assembled into complete sections at the working place.

The object of this invention is to provide a conveyor structure particularly useful for scraper chain conveyors but applicable at least in part to other types of conveyor, which can be assembled and dismantled without tools and which can be dismantled at any point in the conveyor run to give access to the return run of the conveyor.

From one aspect, a conveyor structure according to the invention comprises angle section lower side members spaced apart by transverse skid flats, trough members connected to the angle members by studs on the one member cooperating with slots on the other member and top side members of angle section attached to the lower side members by co-operating pegs and recesses and spaced therefrom at each end by blocks which define with the vertical flanges of the upper and lower side members, apertures for the reception of locking members adapted to connect adjacent sections of the structure together.

From another aspect, a conveyor structure according to the invention comprises at each side two angle sections arranged with one flange of each angle vertical and with the other flange horizontal and directed inwardly, these angle sections being held together by interengaging pegs and recesses and being spaced apart by blocks at each end which with the vertical flanges define apertures adapted to receive double headed locking members which in use engage blocks of adjacent conveyor sections to connect these together, and trough sections attached to the side members by stud and slot connections.

Goaf side plates of any convenient form may be bolted to the side members.

The locking member for connecting adjacent conveyor sections preferably comprises a bar of round or square section having its ends turned at right angles, this bar being inserted in the apertures formed by the blocks and being allowed to drop or being turned to cause the ends to engage behind the blocks.

Other parts of the invention are embodied in the preferred form which will now be described in some detail by way of example, with reference to the accompanying drawings in which:

Fig. 1 is a side view of a section of a conveyor structure with parts of adjacent sections;

Fig. 2 is a plan view of the sections shown in Figure 1;

Fig. 3 is an end view of the section;

Fig. 4 is a section on the line IV—IV of Fig. 2, and

Fig. 5 is a fragmentary cross-sectional view corresponding to line V—V of Figure 2.

In this form, the conveyor structure comprises a number of sections each built up from components. A base frame comprises transverse skid flats 1 attached to longitudinal angle section side members 2, conveniently having flanges of unequal length and having the longer flanges 3 vertical. Upwardly directed slots 4 are punched in the upper edges of the vertical flanges 3. Members 5 of offset or Z section (having two flanges extending in opposite directions from a short web) are riveted to the outside of the vertical flanges 3 so that one arm forming a peg extends parallel to the vertical flanges 3 leaving a recess 6 therebetween. As shown, two such members 5 are provided on each side of the base frame, those on each side being directed in opposite directions. Blocks 7 of square or oblong form are attached to the outer faces of the flanges 3 near one of their ends, said blocks 7, extending beyond said flanges 3 to overlap the adjacent ends of the flanges 3 of a succeeding section, as indicated in Figures 1, 2 and 5.

A trough 8 in which the carrying strand 9 of the chain runs, extends at one end beyond the side members 2 so that it can overlap with the adjacent trough. As shown, this extension comprises a short trough shaped section 10 riveted to the end of the main trough 8. Alternatively the trough 8 consists conveniently of two simple troughs of equal length, one within the other and relatively displaced longitudinally so that only a single thickness of sheet extends at each end for a short distance, one upper and one lower. Headed studs 11, to fit the slots 4 in the flanges 3 of the bottom side members 2, are riveted through the vertical flanges of the trough 8.

Top side members 12 of angle section, preferably having flanges of unequal length and having a rounded corner, are attached to the bottom side members 2 of the base frame so that one (preferably the longer) flange 13 is vertical and the other flange 14 extends inwardly over the base frame and the sides of the trough. The top side members have slots 15 cut in their vertical flanges near one end and blocks 16 are attached to their inner faces near the other end.

Members 17, of offset or Z section similar to the members 5, are riveted to the inner faces of the flanges 13 and arranged so that the arms or pegs of members 17 can engage in the recesses 6 whilst those of members 5 engage in the recesses 18 left between members 17 and the flanges 13.

Bolt holes 19 are punched as required for the attachment of goaf side plates 20.

The sections are connected together by bolts consisting of round or square section bars 21 having their ends 22 turned at right angles; the bolts are slidably supported by clips 23 on the flanges 13.

To assemble the section, the troughs 8 are dropped into the base frames, the headed studs 11 engaging the upwardly directed slots 4 in the flanges 3 of the longitudinal bottom side members 2. The top side members 12 are dropped on with the shorter flanges 14 extending inwardly over the side flanges of the trough and with the arms or pegs of the members 5 and 17 overlapping and engaging in the recesses 6 and 18. Successive sections are hooked together by the bolts 21. The slots 15 in the angle side members 12 provide access to the bolts 21 which are slid through the aperture defined by the vertical flanges 2 and 12 and the blocks 7 and 16 and are dropped over the blocks 16 to couple the sections loosely together by the 90° turned ends 22 respectively butting against the blocks 16 welded to the side members of one section and the clips 23 of the other section. "Snaking" is permitted by the bolts being longer than the distance between extreme sides of the respective blocks 16 and clips 23 at adjoining ends of successive sections. Goaf side plates of the particular form to suit the application are bolted to the goaf side top side members 12 before assembly.

It will be appreciated that the horizontal flange of the top side members 12 rest on the upper edges of the flanges 3 of the longitudinal members 2 of the base frame and thus the weight of a cutting machine mounted on the section is taken directly by the base frame and the use of headed studs on the troughs gives a box girder construction of considerable strength.

It will also be understood that the double pressing construction of the troughs gives an overlap joint and that the fact that the connecting bolts 21 pass under the blocks welded to the outer faces of the longitudinal members of the base frame ensures that the various components are locked together.

To obtain access to the return run of the scraper chain at any point, the bolts 21 are removed, the top side members lifted off vertically and the trough lifted out after the overlap end of the mating trough has been raised.

There may be provided sufficient clearance between the blocks 7 and 16, to permit the bolt 21 to be inserted with the 90° ends 22 vertical so that there is considerable vertical movement possible between the components. It is however possible to increase the spacing between the vertical flanges 3 and 13 so that the bolt can be rotated with the 90° turned ends 22 horizontal, slid between the blocks 7 and 16 and then turned into the vertical position to hook over the blocks 16. In this case the clearance between the blocks can be arranged to limit the vertical movement between the components to any desired minimum.

It will be understood that the invention is not restricted to the details of the preferred form which may be modified without departing from the broad ideas underlying them.

I claim:

1. A sectional conveyor structure comprising a base structure having vertical side flanges for supporting a conveyor trough, and top side members attached to said side flanges by interengaging pegs and recesses, said top side members having horizontal flanges resting on the top edges of the vertical side flanges of the base structure and adapted to support a coal cutter, whereby the weight of the coal cutter is transmitted directly to said base structure.

2. A sectional conveyor structure comprising angle section lower side members spaced apart by transverse skid flats with a flange of each of said lower side members disposed vertically, trough members connected to the angle members by studs on the one member cooperating with slots on the other member, and top side members of angle section attached to the lower side members by cooperating pegs and recesses, said top side members having horizontal flanges resting on the top edges of the vertical flanges of the lower side members, whereby the weight of a coal-cutter mounted on said horizontal flanges is transmitted directly to the lower side members.

3. A conveyor structure according to claim 2 in which said interengaging pegs and recesses are formed by members of Z section fixed to the side members with one flange forming a peg spaced from the associated side member to leave a recess.

4. A demountable conveyor section comprising a base frame including transverse skid flats and longitudinal side members mounted on said skid flats and having vertical flanges, a conveyor trough removably mounted between said vertical flanges, an angle member removably mounted on each of said side members with one flange of said angle member disposed vertically and outside the vertical flange of the respective side members and with the lower free edge thereof bearing on said skid flats the other flange of each angle member being disposed horizontally and overlying the respective edge of the trough member and the vertical flange of the associated side member, whereby said angle and side members form a box girder construction and weight imposed on the horizontal flanges of the said angle members is transmitted directly to the base frame.

5. A demountable conveyor section comprising a base frame including transverse skid flats and longitudinal side members of angle section having vertical flanges and horizontal flanges extending toward each other and mounted on said skid flats to provide slideways for the return run of an endless conveyor member, a trough member removably mounted on and between said vertical flanges and spaced above said horizontal flanges for supporting the working run of an endless conveyor member, an angle member removably mounted on each of said side members with one flange vertical and outside the vertical flange of the side member and the other flange horizontal and overlying the edges of the trough member and vertical flange of the side member, whereby weight imposed on the horizontal flanges of said angle members is transmitted directly to the base frame, means connecting the vertical flanges of the respective angle and side members against relative longitudinal and lateral movement, and means on the adjacent sides at each end of the vertical flanges of the respective angle and side members for connecting successive sections of a conveyor together.

6. A conveyor structure as defined in claim 5 wherein said trough member is connected with said vertical flanges by headed studs on the sides of said trough member, the vertical flanges of said side members having slots opening through the upper edges thereof for receiving said studs.

7. A conveyor structure according to claim 5 wherein said means connecting the vertical flanges of said side and angle members comprise interengaging pegs and recesses formed by offset members of Z-section each having one arm fixed to one of said vertical flanges and the other arm forming a peg spaced from the respective flange and forming a recess therebetween for receiving the peg of a cooperative offset member.

8. A demountable conveyor section comprising a base frame including transverse skid flats and longitudinal side members of angle section having vertical flanges and horizontal flanges extending toward each other and mounted on said skid flats to provide slideways for the return run of an endless conveyor member, a trough member removably mounted on and between said vertical flanges and spaced above said horizontal flanges for supporting the working run of an endless conveyor member, an angle member removably mounted on each of said side members with one flange vertical and outside the vertical flange of the side member and the other flange horizontal and overlying the edges of the trough member and vertical flange of the side member, whereby weight imposed on the horizontal flanges of said angle members is transmitted directly to the base frame, means connecting the vertical flanges of the respective angle and side members against relative longitudinal and lateral movement, and means for connecting successive sections comprising blocks on adjacent sides at each end of said vertical flanges and forming with said flanges longitudinally extending apertures adapted to receive double headed locking members which engage blocks on successive sections.

9. A conveyor structure according to claim 8 in which the locking member is carried by said angle members on each side and comprises a bar having its ends turned at right angles, this bar being inserted in the apertures formed by the blocks and hooked behind the blocks by said downturned ends.

10. A conveyor structure according to claim 8 in which the spacing between the blocks is sufficient to permit a bolt with turned over ends to be inserted with these ends vertical.

11. A conveyor structure according to claim 8 in which the length of the blocks is such that a bolt with turned over ends can be inserted with these ends horizontal.

12. A conveyor section comprising a base structure having vertical side flanges, a trough carried by said side flanges, top side members mounted on said base structure for supporting a carrier and including vertical flanges which are substantially parallel with said side flanges, and blocks on the vertical flanges of said base structure and said top side members adjacent each end thereof and spacing said vertical flanges, said blocks being at different elevations to define between themselves and said vertical flanges apertures for the reception of locking members adapted to connect adjacent sections together.

13. A conveyor structure comprising at each side two angle members arranged with one flange of each vertical and the other flange of each horizontal and directed inwardly, said angle members having interengaging pegs and recesses connecting said members together, a trough mounted on the inner of the two angle members of each side, the outer of the angle members on each side being adapted jointly to support a carrier on the horizontal flanges thereof, stud and slot connections between said trough sections and said latter members, blocks at each end of said members spacing said vertical flanges and which with the vertical flanges define apertures longitudinally of said structure, and double headed locking members mounted in said apertures with the heads thereof engaging blocks of adjacent conveyor sections to connect said sections together.

References Cited in the file of this patent

UNITED STATES PATENTS

| | | |
|---|---|---|
| 2,146,911 | Nyborg | Feb. 14, 1939 |

FOREIGN PATENTS

| | | |
|---|---|---|
| 573,972 | Germany | Apr. 7, 1933 |
| 446,235 | Great Britain | Apr. 27, 1936 |
| 650,415 | Germany | Sept. 23, 1937 |
| 652,685 | Germany | Nov. 5, 1937 |